(12) United States Patent
Ooishi et al.

(10) Patent No.: US 10,425,217 B2
(45) Date of Patent: Sep. 24, 2019

(54) INFORMATION PROCESSING APPARATUS, INFORMATION PROCESSING METHOD, AND PROGRAM

(71) Applicant: Sony Corporation, Tokyo (JP)

(72) Inventors: Noriaki Ooishi, Kanagawa (JP); Minoru Hirata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/770,577

(22) PCT Filed: Oct. 27, 2016

(86) PCT No.: PCT/JP2016/081807
§ 371 (c)(1),
(2) Date: Apr. 24, 2018

(87) PCT Pub. No.: WO2017/082059
PCT Pub. Date: May 18, 2017

(65) Prior Publication Data
US 2018/0316484 A1  Nov. 1, 2018

(30) Foreign Application Priority Data

Nov. 10, 2015  (JP) .................................. 2015-220515

(51) Int. Cl.
*H04L 7/00* (2006.01)
*H04B 1/16* (2006.01)
*H04N 21/43* (2011.01)

(52) U.S. Cl.
CPC ............. *H04L 7/0079* (2013.01); *H04B 1/16* (2013.01); *H04N 21/43* (2013.01)

(58) Field of Classification Search
CPC ...... H04N 5/781; H04N 21/43; H04L 7/0079; H04B 1/16
See application file for complete search history.

(56) References Cited

U.S. PATENT DOCUMENTS

| | | | | |
|---|---|---|---|---|
| 2002/0031330 A1* | 3/2002 | Ono | ..................... | G11B 27/005 386/330 |
| 2003/0160897 A1* | 8/2003 | Park | ....................... | H04N 9/45 348/498 |
| 2017/0163710 A1* | 6/2017 | Iguchi | .................. | H04L 65/607 |

FOREIGN PATENT DOCUMENTS

| | | |
|---|---|---|
| EP | 1 208 346 A1 | 1/2003 |
| EP | 1 280 346 A1 | 1/2003 |

(Continued)

OTHER PUBLICATIONS

Extended European Search Report dated Aug. 1, 2018 for corresponding European Application No. 16864023.3.

(Continued)

*Primary Examiner* — Janice N Tieu
(74) *Attorney, Agent, or Firm* — Michael Best & Friedrich LLP

(57) ABSTRACT

This disclosure relates to an information processing apparatus, an information processing method, and a program that perform clock recovery processing efficiently and stably when a data stream having time information is received and clock recovery processing is performed. In one example, time information is extracted from a data stream including the time information serving as a reference when generating a system clock signal, and the time information is stored in a storage section. Further, the time information stored in the storage section is output synchronously with the system clock signal on the basis of a transmission rate of the data stream and position information regarding the time information in the data stream, and the clock recovery processing is performed on the basis of the time information output from the storage section and the system clock signal is generated.

19 Claims, 10 Drawing Sheets

(56) References Cited

FOREIGN PATENT DOCUMENTS

| JP | 10-334615 | 12/1998 |
|---|---|---|
| JP | 2000-341684 A | 12/2000 |
| JP | 2004-289249 A | 10/2004 |
| JP | 2005-295156 A | 10/2005 |
| JP | 2008-160239 A | 7/2008 |

OTHER PUBLICATIONS

ARIB STD-B44, "Transmission System for Advanced Wide Band Digital Satellite Broadcasting," Ver 2.0, Jul. 31, 2014.
ARIB STD-B44, "Transmission System for Advanced Wide Band Digital Satellite Broadcasting," Ver 1.0, Jul. 29, 2009.
ARIB STD-B20, "Transmission System for Digital Satellite Broadcasting," Ver 3.0 Translation.
ARIB STD-B20, "Transmission System for Digital Satellite Broadcasting," Ver 3.0, Nov. 6, 1998.
ISO/IEC JTC1/SC29/WG11, "International Organisation for Standardisation Organisation Internationale de Normalisation ISO/IEC JTC1/SC29/WG11Coding of Moving Pictures and Associated Audio," N0801, Nov. 13, 1994.

* cited by examiner

INFORMATION PROCESSING APPARATUS, INFORMATION PROCESSING METHOD, AND PROGRAM

TECHNICAL FIELD

The present technology relates to an information processing apparatus, an information processing method, and a program. Particularly, in a case in which a data stream including time information is received and clock recovery processing is performed, the present technology relates to an information processing apparatus, an information processing method, and a program that aim at enabling the clock recovery processing to be performed efficiently and stably.

BACKGROUND ART

In a field of digital television broadcasting, coded data such as video or audio is, after each packetized, multiplexed in a format capable of synchronous reproduction and is transmitted. As a multiplexed format, a transport stream (TS) of MPEG-2 Systems standard (NPL 1) or the like is known.

After a broadcast TS is demodulated in a receiver, when the TS is reproduced or recorded, it is necessary to synchronize a system clock on the reception side with a reference clock on the transmission side having a predetermined frequency such as 27 MHz. Specifically, the synchronous processing is processing in which a system clock is locked to a PCR (Program Clock Reference) included in the TS by using a PLL (Phase Locked Loop) or the like.

The processing in which the system clock on the reception side is synchronized with the reference clock on the transmission side is referred to as "clock recovery processing." In addition, a circuit in which the clock recovery processing is performed is referred to as a "clock recovery circuit." A configuration of the clock recovery circuit is, for example, disclosed in FIG. D.2 of NPL 1.

To stably lock the system clock to the PCR in the clock recovery circuit, it is necessary to suppress a transmission jitter (hereinafter, referred to as a PCR jitter) of PCR data input to the clock recovery circuit.

CITATION LIST

Patent Literature

PTL 1

JP 2008-160239A

Non Patent Literature

[NPL 1]
ISO/IEC 13818-1, Information technology-Generic coding of moving pictures and associated audio information: Systems
[NPL 2]
ARIB STD-B20 Transmission System for Digital Satellite Broadcasting Standard
[NPL 3]
ARIB STD-B44 Transmission System for Advanced Wide Band Digital Satellite Broadcasting Standard

SUMMARY

Technical Problems

Regarding an intermittently transmitted broadcasting TS, a method for suppressing a PCR jitter by using an N:M frequency divider is disclosed in PTL 1. In the method, the TS is buffered in units of frames one time and is output under the control of read timing. However, a memory for buffering the TS is required and circuit costs are made high.

In addition, since the method is accompanied by an input-output of the TS, a load on a memory bus increases. Further, the TS is buffered one time and thereby a buffer residence time of the TS occurs. A delay time occurs until the next processing for the TS such as decode processing.

The present technology has been made in view of the circumstances as described above. In a case in which a data stream including time information is received and clock recovery processing is performed, the present technology aims at enabling the clock recovery processing to be performed efficiently and stably.

Solution to Problems

An information processing apparatus according to a first aspect of the present technology includes an extraction section configured to extract time information from a data stream including the time information serving as a reference when generating a system clock signal, a storage section configured to store the time information, a control section configured to output the time information stored in the storage section synchronously with the system clock signal on the basis of a transmission rate of the data stream and position information regarding the time information in the data stream, and a generation section configured to perform clock recovery processing on the basis of the time information output from the storage section and generate the system clock signal.

The control section may specify the transmission rate on the basis of a transmission parameter accompanying the data stream.

The control section may divide a frequency of the system clock signal in accordance with a ratio of the frequency of the system clock signal and the transmission rate and output the time information from the storage section synchronously with a clock signal in a position of the time information indicated by the position information among the clock signals obtained by dividing the frequency thereof.

There may be further provided a decode section configured to decode the data stream, and a reproduction control section configured to reproduce data obtained by decoding the data stream synchronously with the system clock signal.

The data stream may be a TS, and the time information may be a PCR.

The data stream may be an MMT-TLV stream, and the time information may be an NTP.

The transmission parameter may be TMCC information.

According to a second aspect of the present technology, the time information is extracted from a data stream including the time information serving as a reference when generating a system clock signal, and the time information is stored in a storage section. Further, the time information stored in the storage section is output synchronously with the system clock signal on the basis of a transmission rate of the data stream and position information regarding the time information in the data stream, and clock recovery processing is performed on the basis of the time information output from the storage section and the system clock signal is generated.

Advantageous Effect of Invention

According to the present technology, in a case in which a data stream including time information is received and clock recovery processing is performed, it is possible to perform the clock recovery processing efficiently and stably.

Note that the effect described herein is not necessarily limited, and any effect that is described in the present disclosure may be exhibited.

DESCRIPTION OF EMBODIMENTS

Hereinafter, modes for carrying out the present technology will be described. The description is made in the following order.

1. First Embodiment (an example in which clock recovery processing and decode processing are performed by one chip)
  (1) Configuration Example of Reception Apparatus
  (2) Example of Configuration and Operation of PCR Extraction Section 24
  (3) Example of Configuration and Operation of Output Controller 34
  (4) Example of Processes of Output Controller 34
  (5) Example of Processes of PCR Extraction Section 24
2. Second Embodiment (an example in which the clock recovery processing and the decode processing each are performed by different chips)
3. Modification Example

1. First Embodiment

<(1) Configuration Example of Reception Apparatus>

Figure 1:
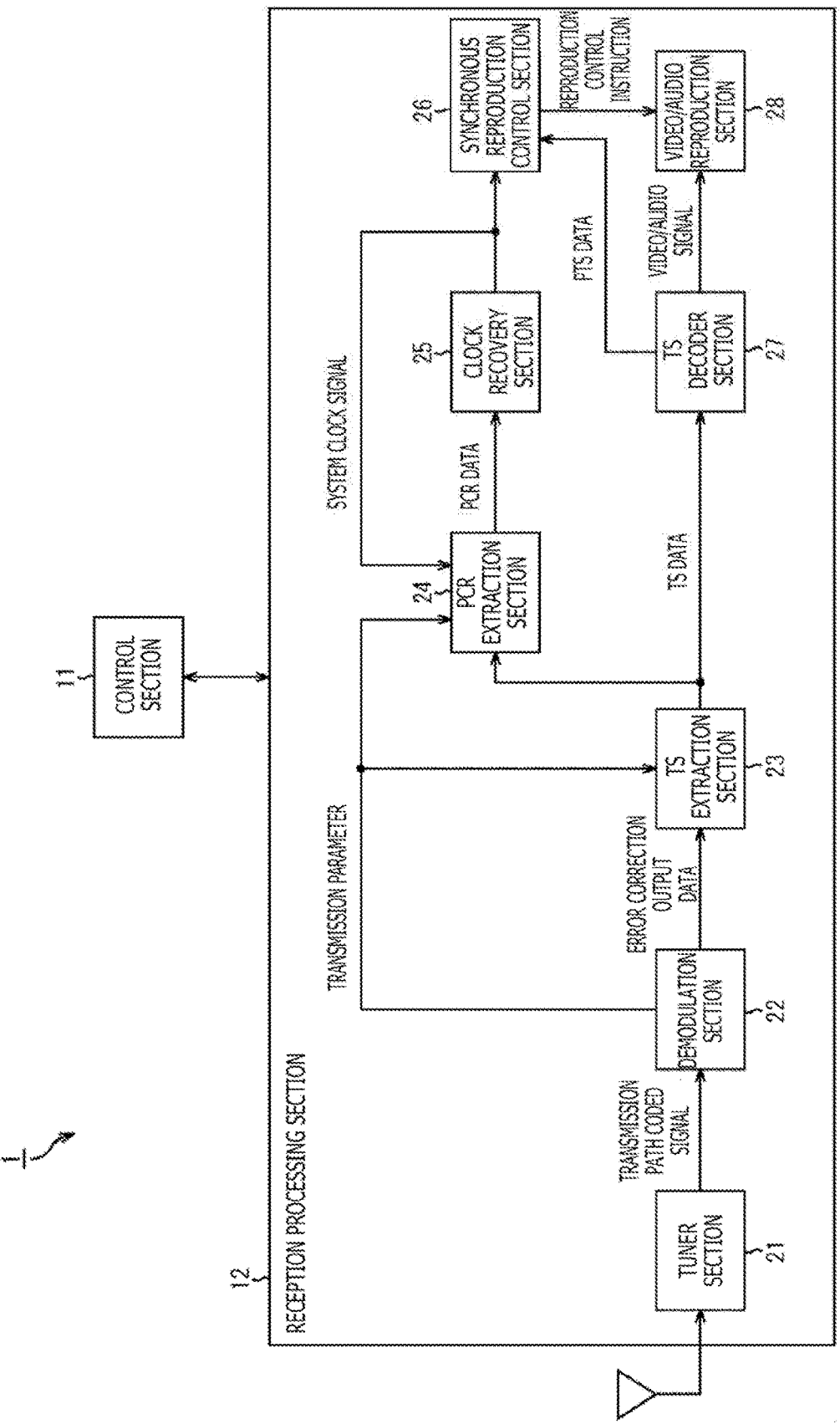
FIG. 1 is a block diagram illustrating a configuration example of a reception apparatus to which the present technology is applied.

FIG. 1 is a block diagram illustrating a configuration example of a reception apparatus according to an embodiment of the present technology.

A reception apparatus 1 of FIG. 1 includes a control section 11 and a reception processing section 12.

The control section 11 includes a CPU (Central Processing Unit), a ROM (Read Only Memory), a RAM (Random Access Memory), and the like. The control section 11 executes a predetermined program and controls an operation of the reception processing section 12.

The reception processing section 12 includes a tuner section 21, a demodulation section 22, a TS extraction section 23, a PCR extraction section 24, a clock recovery section 25, a synchronous reproduction control section 26, a TS decoder section 27, and a video/audio reproduction section 28. The reception processing section 12 includes, for example, one chip (LSI).

The tuner section 21 extracts a signal of a predetermined channel from a broadcast wave received by an antenna and supplies the signal to the demodulation section 22 as a transmission path coded signal. Not the signal received by the antenna but a signal transmitted via a cable may be input to the tuner section 21.

The demodulation section 22 performs demodulation processing and error correction processing on the transmission path coded signal supplied from the tuner section 21 and supplies the signal obtained in the result to the TS extraction section 23 as error correction output data. In addition, the demodulation section 22 acquires transmission control information (hereinafter, referred to as a transmission parameter) accompanying the error correction output data from the transmission path coded signal supplied from the tuner section 21 and supplies the transmission parameter to the TS extraction section 23 and the PCR extraction section 24.

The "error correction output data" depends on a digital broadcast standard of a signal processed by the reception apparatus 1. For example, in a case in which the digital broadcast standard of the signal processed by the reception apparatus 1 is a domestic satellite digital broadcast standard (NPL 2), a frame constituting a TS corresponds to the error correction output data. Each frame includes a plurality of slots and the TS is multiplexed in units of slots.

In a similar manner, the "transmission parameter" also depends on the digital broadcast standard of the signal processed by the reception apparatus 1. For example, in a case in which the digital broadcast standard of the signal processed by the reception apparatus 1 is a domestic satellite digital broadcast standard (NPL 2), TMCC (Transmission and Multiplexing Configuration Control) information corresponds to the transmission parameter. The TMCC information is control information transmitted while accompanying a frame. On the basis of the TMCC information, it is possible for the reception apparatus 1 to specify a slot in which a desired TS is included in the frame, or the like.

From the error correction output data supplied from the demodulation section 22, the TS extraction section 23 extracts desired TS data on the basis of the transmission parameter and supplies the TS data to the PCR extraction section 24 and the TS decoder section 27.

In a case in which the signal processed by the reception apparatus 1 is a signal of the above-described domestic satellite digital broadcast standard (NPL 2), the TS extraction section 23 selects the desired slot on the basis of the TMCC information from the frame supplied from the demodulation section 22 and extracts the TS data from the selected slot. The TS extraction section 23 supplies the extracted TS data to the PCR extraction section 24 and the TS decoder section 27.

The PCR extraction section 24 extracts desired PCR data from the TS data supplied from the TS extraction section 23, temporarily stores the PCR data internally, and then supplies the PCR data to the clock recovery section 25. For example, the PCR data is data in which accuracy is 27 MHz, a field length is 6 bytes, and a transmission cycle is from several tens of millisecond to 100 millisecond. As described in detail below, supply timing of the PCR data to the clock recovery section 25 is determined on the basis of the transmission parameter supplied from the demodulation section 22 and a system clock signal supplied from the clock recovery section 25.

The clock recovery section 25 performs clock recovery processing for generating the system clock signal (frequency: 27 MHz) on the basis of the PCR data supplied from the PCR extraction section 24. The clock recovery section 25 supplies the system clock signal obtained by the clock recovery processing to the PCR extraction section 24 and the synchronous reproduction control section 26.

The clock recovery processing is processing for locking the system clock to the PCR included in the TS by using a Phase Locked Loop (PLL) or the like. In a case in which a broadcast stream is the TS, the clock recovery section 25 has a configuration disclosed, for example, in Figure D.2 of NPL 1.

The synchronous reproduction control section 26 supplies a reproduction control instruction of a video signal and an audio signal to the video/audio reproduction section 28 on the basis of PTS (Presentation Time-Stamp) data supplied from the TS decoder section 27. The processing by the synchronous reproduction control section 26 is performed synchronously with the system clock signal supplied from the clock recovery section 25.

The TS decoder section 27 performs decode processing on the TS data supplied from the TS extraction section 23 and supplies a video signal and an audio signal obtained in the result to the video/audio reproduction section 28. In addition, the TS decoder section 27 acquires the PTS data that is presentation time information of the video signal and the audio signal from the TS data and supplies the PTS data to the synchronous reproduction control section 26. The TS decoder section 27 includes, for example, a TS demultiplexer, an MPEG video decoder, an MPEG audio decoder, and the like.

The video/audio reproduction section 28 reproduces the video signal and the audio signal supplied from the TS decoder section 27 on the basis of the reproduction control instruction supplied from the synchronous reproduction control section 26. The video signal reproduced by the video/audio reproduction section 28 is supplied to a display section and is used to display videos. On the other hand, the audio signal is supplied to a speaker and is used to output audios. The display section and the speaker may be installed in the same housing as the reception apparatus 1 and be installed in a housing different from that of the reception apparatus 1.

As described above, in the reception apparatus 1, only the PCR data is extracted from the TS data and is stored. Further, the stored PCR data is used for the clock recovery processing, and therefore the TS data need not be buffered. Further, in the reception apparatus 1, read timing of the stored PCR data is controlled and the PCR data is supplied to the clock recovery section 25. This process permits PCR jitter to be suppressed.

<(2) Example of Configuration and Operation of PCR Extraction Section 24>

Figure 2:
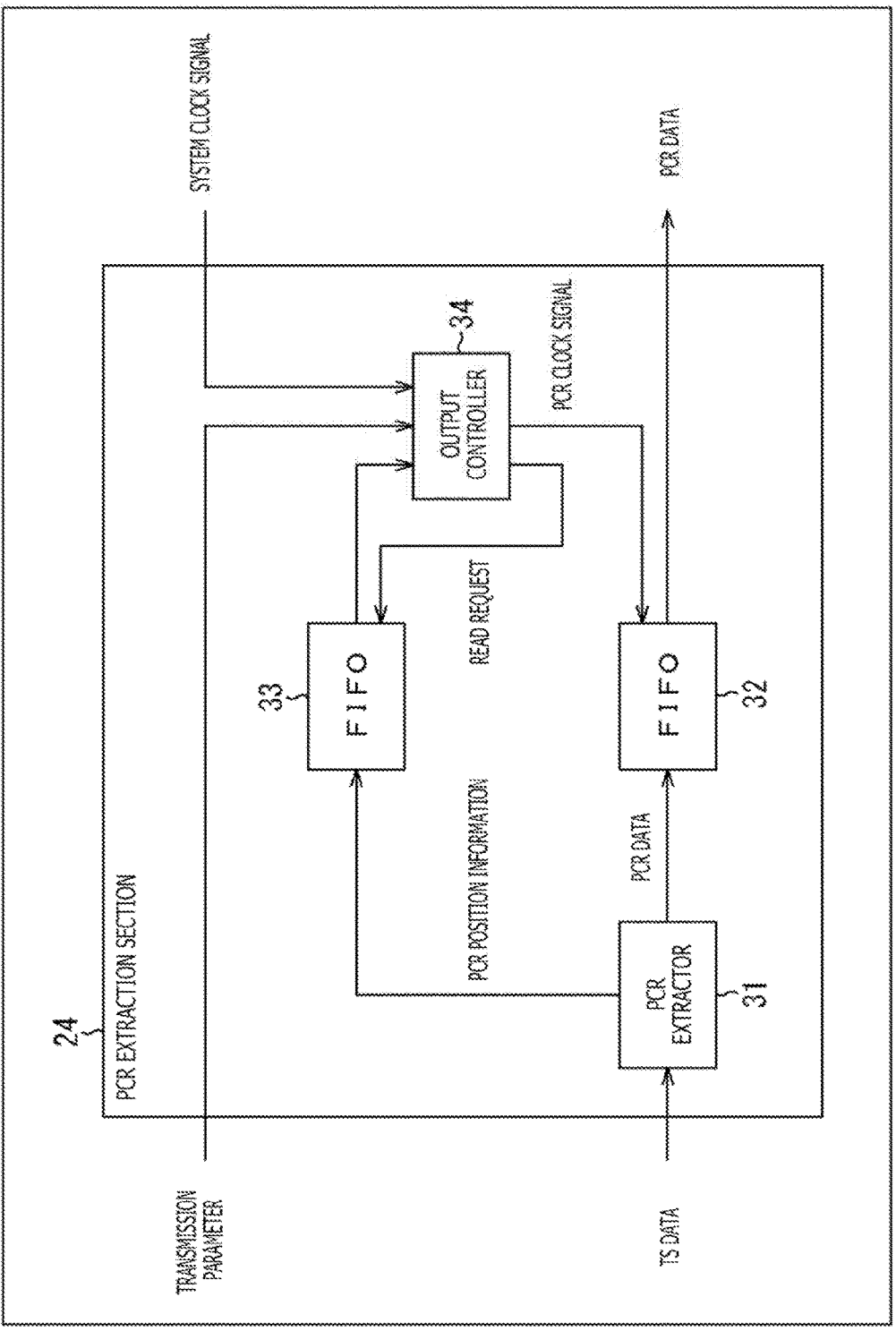
FIG. 2 is a block diagram illustrating a configuration example of a PCR extraction section of FIG. 1.

FIG. 2 is a block diagram illustrating a configuration example of the PCR extraction section 24 of FIG. 1.

As illustrated in FIG. 2, the PCR extraction section 24 includes a PCR extractor 31, a FIFO 32, a FIFO 33, and an output controller 34.

The PCR extractor 31 analyzes the TS data supplied from the TS extraction section 23 and extracts the desired PCR data. The PCR extractor 31 supplies the extracted PCR data to the FIFO 32. Further, the PCR extractor 31 acquires information indicative of a position of the PCR data in the TS data and supplies the information to the FIFO 33.

The position of the PCR data is, for example, indicated by byte information using as a reference a predetermined position such as a head of the TS data and is generated by the PCR extractor 31 on the basis of analysis results of the TS data. Hereinafter, information indicative of the position of the PCR data generated by the PCR extractor 31 is arbitrarily referred to as PCR position information.

The FIFO 32 temporarily stores the PCR data supplied from the PCR extractor 31. The PCR data stored in the FIFO 32 is read synchronously with the PCR clock signal supplied from the output controller 34 and is supplied to the clock recovery section 25. The FIFO 32 has a capacity for storing one or more pieces of PCR data.

The FIFO 33 temporarily stores the PCR position information supplied from the PCR extractor 31. The PCR position information stored in the FIFO 33 is read on the basis of a read request supplied from the output controller 34 and is supplied to the output controller 34. The FIFO 33 has a capacity for storing one or more pieces of PCR position information.

The output controller 34 supplies the read request to the FIFO 32 and reads the PCR position information. Further, the output controller 34 generates the PCR clock signal on the basis of the transmission parameter supplied from the demodulation section 22, the system clock signal supplied from the clock recovery section 25, and the PCR position information supplied from the FIFO 33 and supplies the PCR clock signal to the FIFO 32. The generation of the PCR clock signal serving as a reference of the read timing of the PCR data from the FIFO 32 will be described in detail below.

Figure 3:
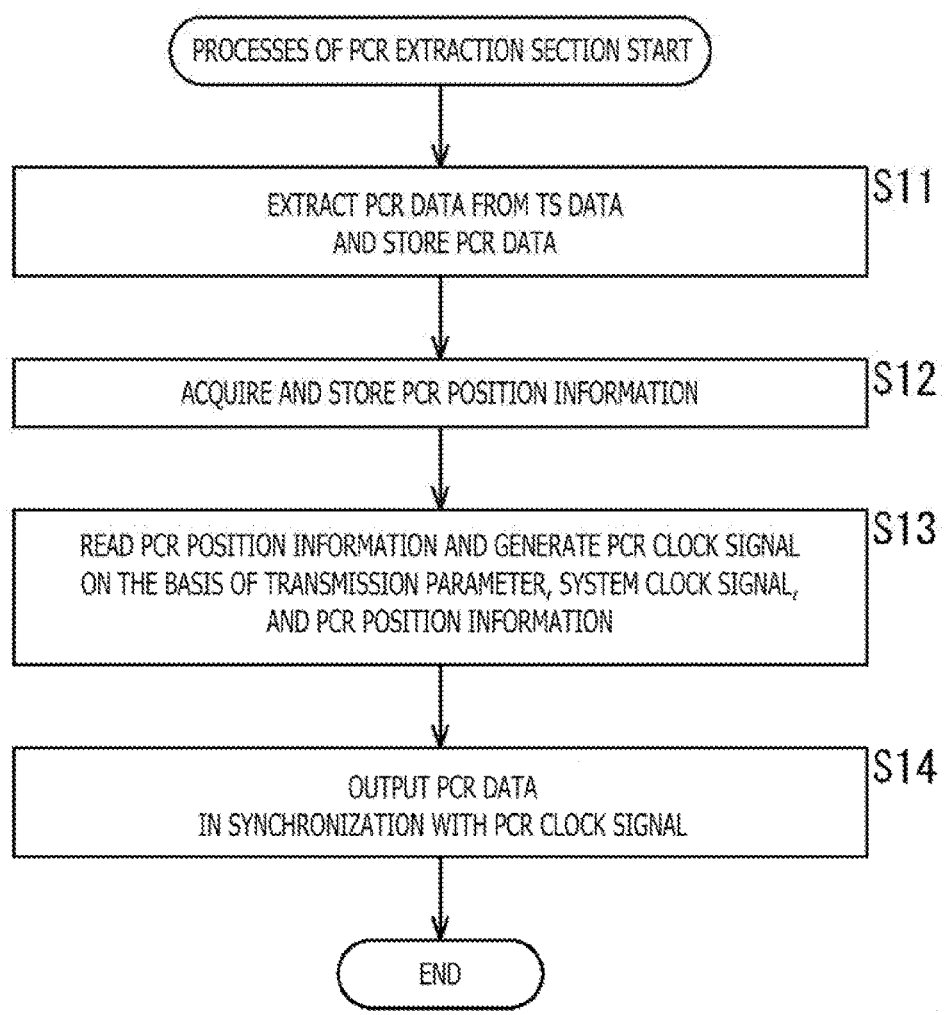
FIG. 3 is a flowchart describing operations of the PCR extraction section.

Here, operations of the PCR extraction section 24 having the above-described configuration will be described with reference to a flowchart of FIG. 3.

In step S11, the PCR extractor 31 extracts the PCR data from the TS data supplied from the TS extraction section 23 and stores the PCR data in the FIFO 32.

In step S12, the PCR extractor 31 acquires the PCR position information indicative of a position of the extracted PCR data and stores the PCR position information in the FIFO 33.

In step S13, the output controller 34 outputs the read request to the FIFO 33 and reads the PCR position information. In addition, the output controller 34 generates the PCR clock signal on the basis of the transmission parameter supplied from the demodulation section 22, the system clock signal supplied from the clock recovery section 25, and the PCR position information read from the FIFO 33 and outputs the PCR clock signal to the FIFO 32.

In step S14, the FIFO 32 outputs the stored PCR data synchronously with the PCR clock signal supplied from the output controller 34. Then, the process ends. The PCR clock signal serving as a reference of the output timing of the PCR data is a signal generated by using the system clock signal. It may safely be said that output of the PCR data from the FIFO 32 is performed synchronously with the system clock signal.

<(3) Example of Configuration and Operation of Output Controller 34>

Figure 4:
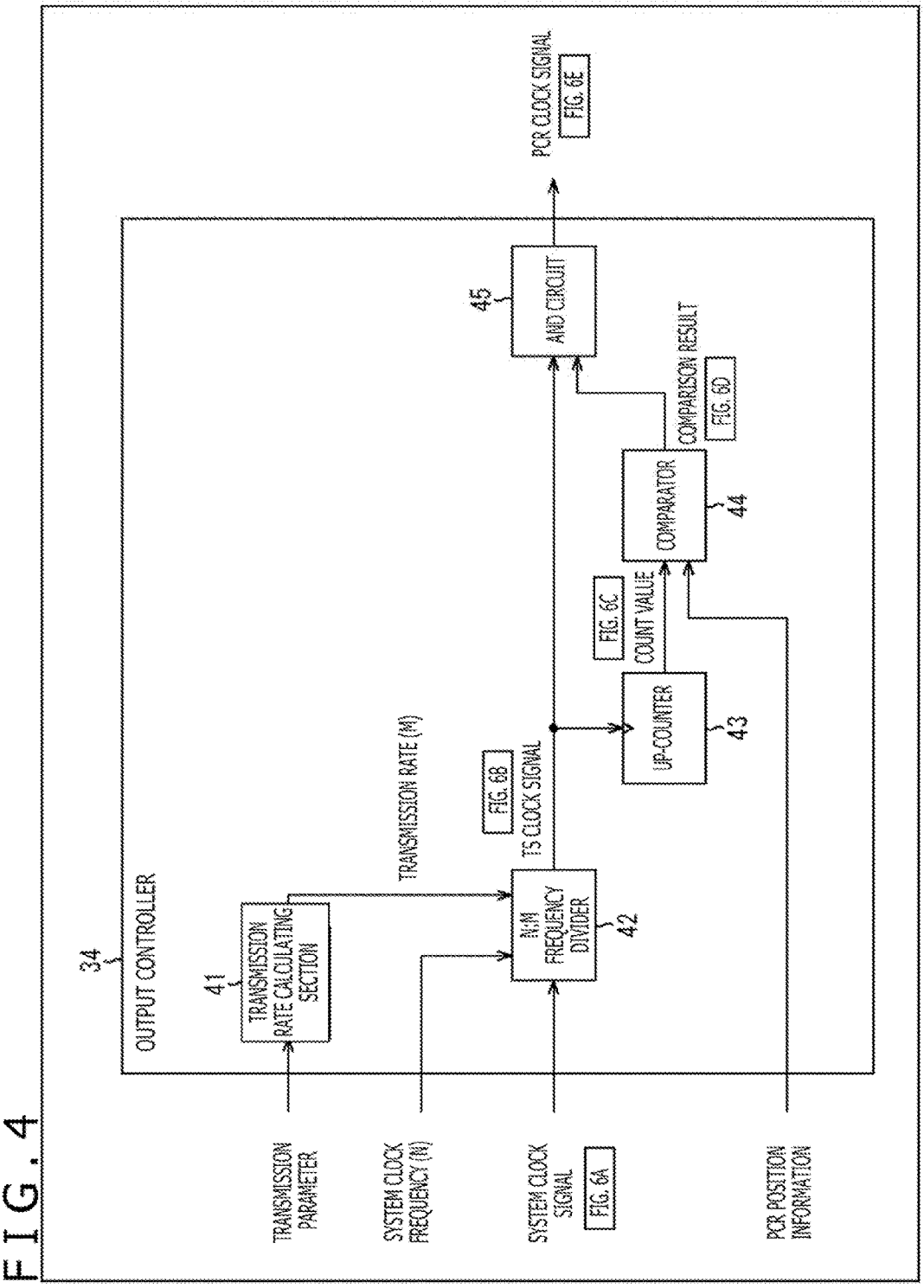
FIG. 4 is a block diagram illustrating a configuration example of an output controller of FIG. 2.

FIG. 4 is a block diagram illustrating a configuration example of the output controller 34 of FIG. 2.

As illustrated in FIG. 4, the output controller 34 includes a transmission rate calculating section 41, an N:M frequency divider 42, an up-counter 43, a comparator 44, and an AND circuit 45.

The transmission rate calculating section 41 calculates a transmission rate of the TS data on the basis of the transmission parameter supplied from the demodulation section 22. A method for calculating the transmission rate depends on the digital broadcast standard. In the domestic satellite digital broadcast standard (NPL 2), for example, in a case in which a modulation scheme is TC8PSK, a transmission rate R is calculated by the following formula (1).

[Math. 1]

$$R=(2/3)*3*S*(204/208)*(188/204)*(N/48) \quad (1)$$

In formula (1), S represents a symbol rate (28.860 Mbaud) and N represents the number of assigned slots (0 to 48). In addition, a unit of R is Mbps (bps: bit per second). The number of assigned slots N is transmitted as a portion of the TMCC information.

The N:M frequency divider 42 divides the frequency of the system clock signal supplied from the clock recovery section 25 at a frequency division ratio of N:M on the basis of the system clock frequency (N) supplied from the control section 11 and the transmission rate (M) supplied from the transmission rate calculating section 41. Information indicative of the system clock frequency is supplied from the control section 11 to the N:M frequency divider 42. For example, in a case in which the transmission data is TS data, the system clock frequency (N) is 27 MHz.

Further, the N:M frequency divider 42 supplies a signal obtained as frequency division results to the up-counter 43 and the AND circuit 45. Hereinafter, a signal obtained by dividing the frequency of the system clock signal is arbitrarily referred to as a TS clock signal.

The TS clock signal is a signal having the frequency necessary to transmit the TS data. For example, in a case in which the transmission rate of the TS data is 24 Mbps and the TS data is transmitted in units of bits, a minimum value of the frequency of the TS clock signal is 24 MHz. Further, for example, in a case in which the transmission rate of the TS data is 24 Mbps and the TS data is transmitted in units of bytes (8 bits), the minimum value of the frequency of the TS clock signal is 3(=24/8) MHz.

The up-counter 43 increases a self-output value by one synchronously with the TS clock signal supplied from the N:M frequency divider 42. A count value that is an output value of the up-counter 43 is supplied to the comparator 44.

The comparator 44 compares the count value supplied from the up-counter 43 and the PCR position information read from the FIFO 33. In a case in which it is determined that they are equal to each other, signals to be asserted are supplied to the AND circuit 45 as comparison results.

The AND circuit 45 calculates a logical product (AND) between the TS clock signal supplied from the N:M frequency divider 42 and the comparison result supplied from the comparator 44 and supplies a signal obtained in the result to the FIFO 32 as the PCR clock signal. The TS clock signal is valid during a period in which the comparison result output by the comparator 44 is an H level and the TS clock signal is output as the PCR clock signal.

Figure 5:
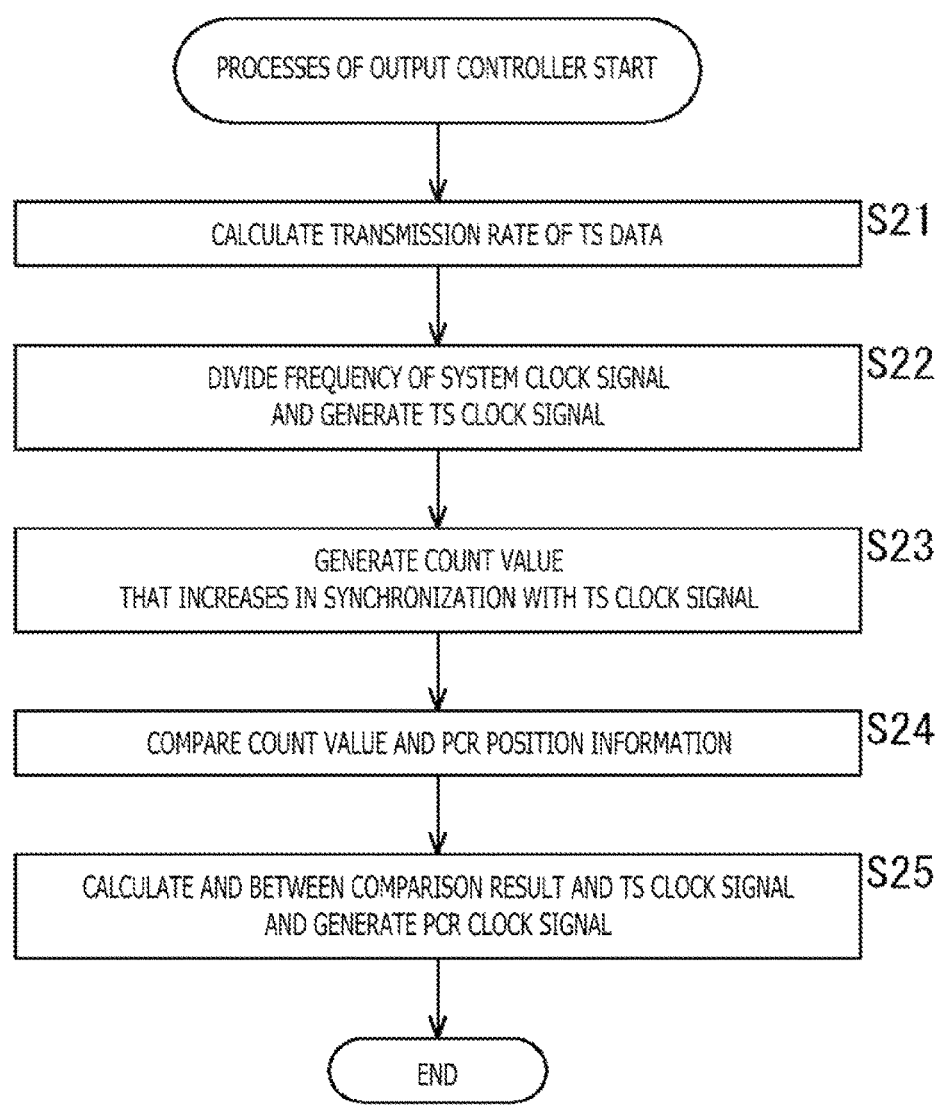
FIG. 5 is a flowchart describing operations of the output controller.

Here, operations of the output controller 34 having the configuration as described above will be described with reference to a flowchart of FIG. 5.

In step S21, the transmission rate calculating section 41 calculates the transmission rate of the TS data on the basis of the transmission parameter supplied from the demodulation section 22.

In step S22, the N:M frequency divider 42 divides the frequency of the system clock signal at the frequency division ratio of N:M on the basis of the system clock frequency (N) supplied from the control section 11 and the transmission rate (M) supplied from the transmission rate calculating section 41 and generates the TS clock signal.

In step S23, the up-counter 43 generates the count value that increases by one synchronously with the TS clock signal supplied from the N:M frequency divider 42.

In step S24, the comparator 44 compares the count value supplied from the up-counter 43 and the PCR position information read from the FIFO 33.

In step S25, the AND circuit 45 calculates a logical product between the comparison result by the comparator 44 and the TS clock signal supplied from the N:M frequency divider 42 and generates the PCR clock signal. Then, the process ends.

<(4) Example of Processes of Output Controller 34>

Figure 6:
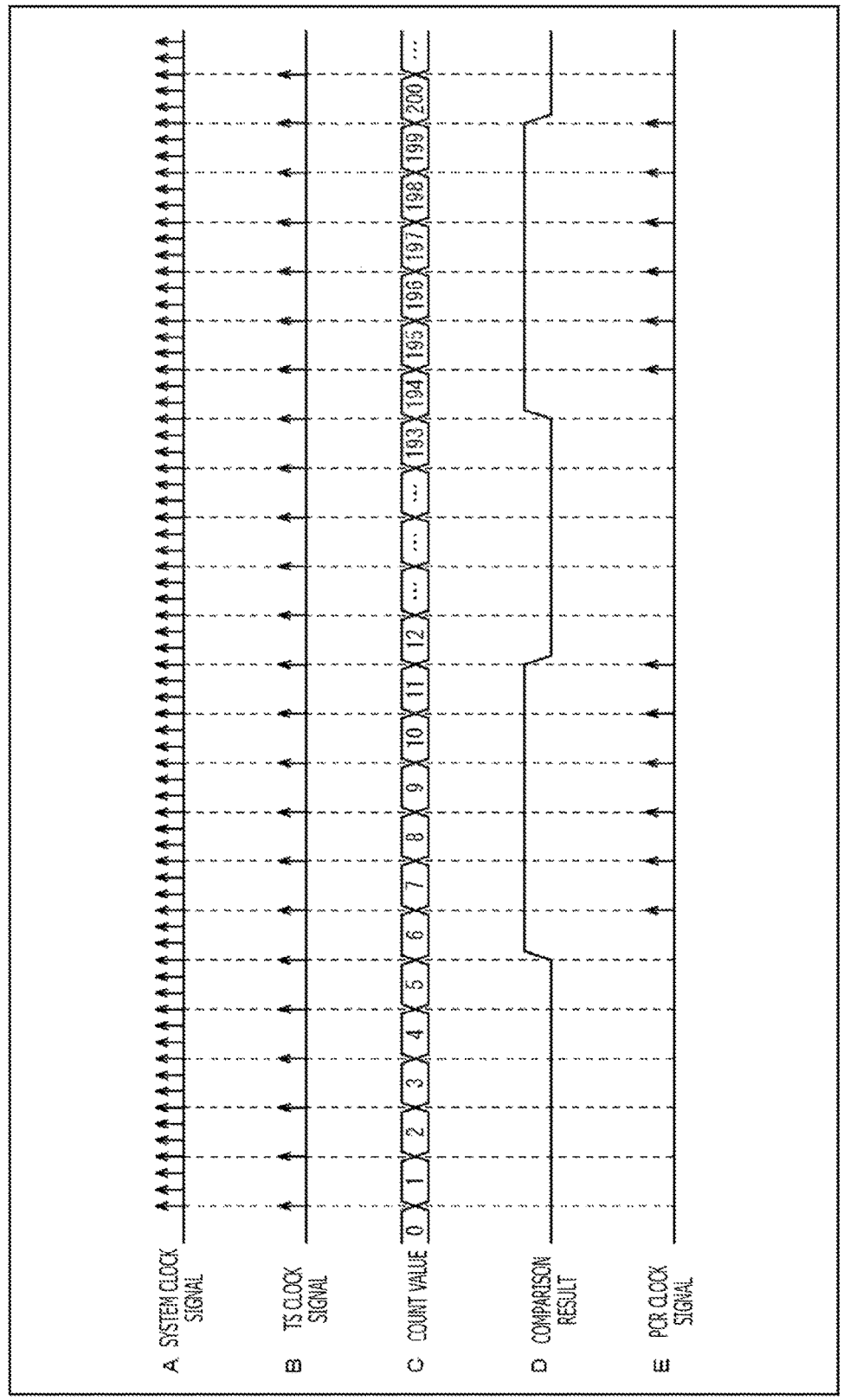
FIG. 6 is a diagram illustrating an example of processes of the output controller.

FIG. 6 is a diagram illustrating an example of the processes of the output controller 34.

In this example, the system clock frequency (N) is 27 MHz and the transmission rate (M) is 72 Mbps. Further, transmission of the PCR data from the PCR extraction section 24 (FIFO 32) to the clock recovery section 25 is performed in units of bytes.

As the PCR position information, two pairs of parameter sets {6,7,8,9,10,11} and {194,195,196,197,198,199} are assumed to be given. A first parameter set indicates that PCR data of six bytes is present in a sixth byte to an eleventh byte from the head of the TS data. In a similar manner, a second parameter set indicates that PCR data of six bytes is present in a 194th byte to a 199th byte from the head of the TS data.

A of FIG. 6 illustrates the system clock signal (frequency: 27 MHz) supplied from the clock recovery section 25 to the N:M frequency divider 42.

B of FIG. 6 illustrates the TS clock signal (frequency: 3 MHz) supplied from the N:M frequency divider 42 to the up-counter 43. The frequency of the system clock signal of A of FIG. 6 is divided at the frequency division ratio of N:M=27:72/8=1:3 and thereby the TS clock signal as illustrated in B of FIG. 6 is generated.

C of FIG. 6 illustrates the count values supplied from the up-counter 43 to the comparator 44. The count value increases by one synchronously with the TS clock signal illustrated in B of FIG. 6.

D of FIG. 6 illustrates comparison results supplied from the comparator 44 to the AND circuit 45. An H level of the comparison results indicates that the TS clock signal is asserted. In an example illustrated in D of FIG. 6, the TS clock signal is asserted in the interval (intervals for six clocks of the TS clock signal) that is indicated by the two pairs of parameter sets in which the PCR position information and the count value illustrated in C of FIG. 6 are equal to each other.

E of FIG. 6 illustrates the PCR clock signal supplied from the AND circuit 45 to the FIFO 32. Signals that oscillate in the same frequency as the TS clock signal are output as the PCR clock signal in the interval in which the comparison results illustrated in D of FIG. 6 are asserted. That is, from among the TS clock signals, the TS clock signal is output as the PCR clock signal in the interval in which the comparison results are asserted.

<(5) Example of Processes of PCR Extraction Section 24>

Figure 7:
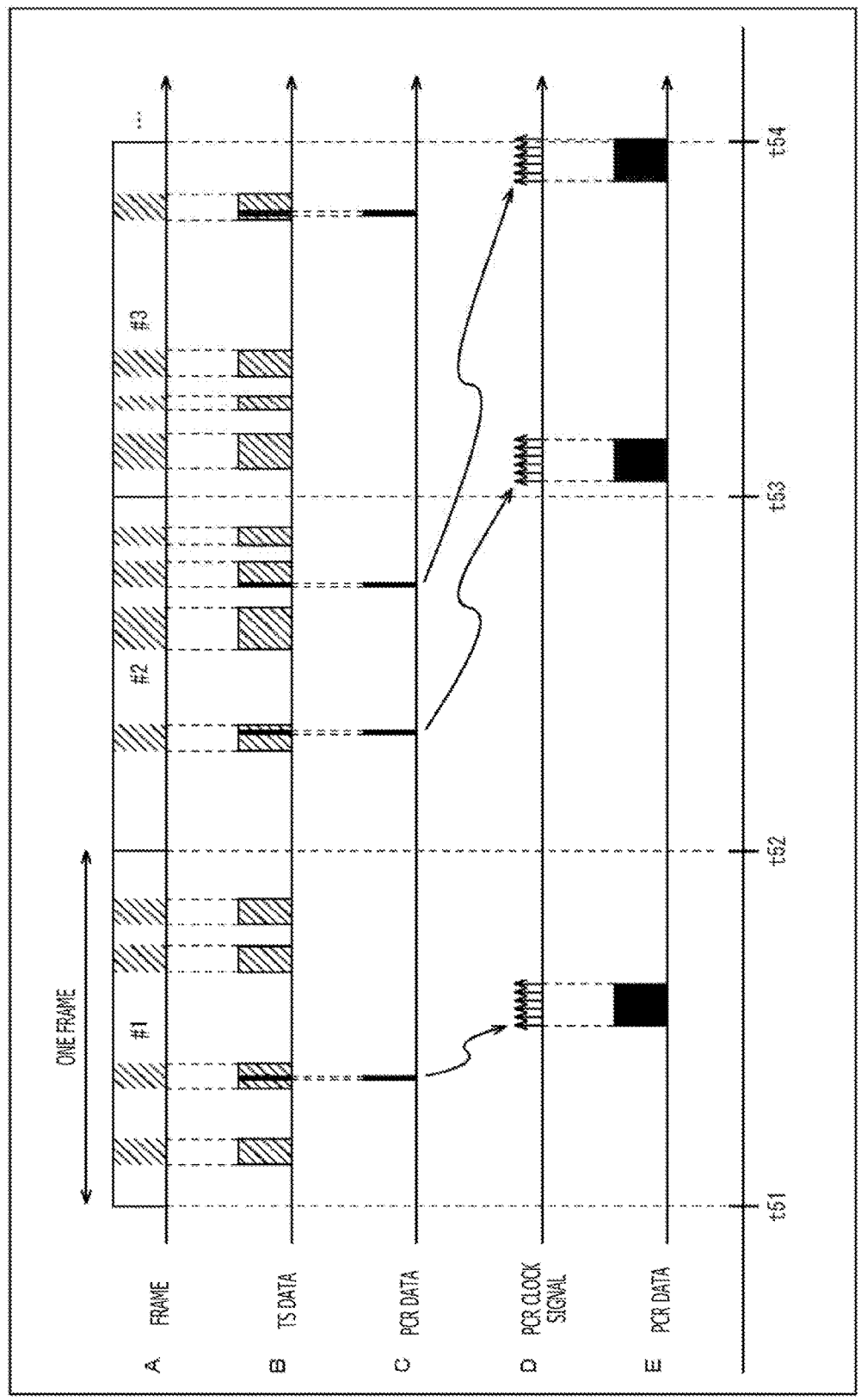
FIG. 7 is a diagram illustrating an example of processes of the PCR extraction section.

FIG. 7 is a diagram illustrating an example of processes of the PCR extraction section 24.

Here, a case in which a standard of signals processed by the reception apparatus 1 is the domestic satellite digital broadcast standard (NPL 2) will be described. In the domestic satellite digital broadcast standard, the error correction output data is data constituting a frame. Each frame includes a plurality of slots and the TS data is transmitted by using slots.

A of FIG. 7 illustrates the error correction output data (frame) supplied from the demodulation section 22 to the TS extraction section 23.

A frame #1 is output for the duration from time t51 to time t52 and a frame #2 is output for the duration from time t52 to time t53. Further, a frame #3 is output for the duration from time t53 to time t54. Desired TS data is transmitted in slots indicating by a hatched part illustrated in A of FIG. 7.

B of FIG. 7 illustrates the TS data that is extracted by the TS extraction section 23 and is supplied to the PCR extraction section 24 (the PCR extractor 31) and the TS decoder section 27. The TS data supplied to the PCR extraction section 24 (the PCR extractor 31) is data for extracting the PCR data and the TS data supplied to the TS decoder section 27 is data for decoding the PCR data.

The desired PCR data is transmitted by a portion indicating a black line illustrated in B of FIG. 7. For example, the PCR data is included in a second slot that is extracted from the frame #1. Among slots, a slot including the PCR data and a slot not including the PCR data are present.

From the frame (A of FIG. 7) supplied from the demodulation section 22, the TS extraction section 23 selects a slot that transmits the desired TS data and extracts the TS data included therein. The TS data output from the TS extraction section 23 is intermittent data as illustrated in B of FIG. 7.

C of FIG. 7 illustrates the PCR data that is supplied from the PCR extractor 31 to the FIFO 32 and is stored in the FIFO 32.

D of FIG. 7 illustrates the PCR clock signal supplied from the output controller 34 to the FIFO 32. The PCR clock signal illustrated in D of FIG. 7 corresponds to the PCR clock signal illustrated in E of FIG. 6.

E of FIG. 7 illustrates the PCR data supplied from the PCR extraction section 24 (the FIFO 32) to the clock recovery section 25. As illustrated in E of FIG. 7, the PCR data is read from the FIFO 32 by one byte synchronously with the PCR clock signal.

The PCR data read from the FIFO 32 is used for the clock recovery processing in the clock recovery section 25 and the system clock signal is generated. The generated system clock signal is used for the synchronous reproduction control of video/audio in the synchronous reproduction control section 26 as described above.

As described above, in the reception apparatus 1, even if a desired data stream is transmitted intermittently, large data of a frame unit etc. need not be buffered in order to generate the system clock signal. Through this process, it is possible to delete a memory for buffering and it is possible to suppress circuit costs and loads on a memory bus.

In addition, as compared with a case in which large data is buffered, it is possible to reduce a delay time for processing and it is possible to suppress transmission jitter of time information used for the clock recovery processing.

That is, the reception apparatus 1 can perform the clock recovery processing efficiently and stably.

2. Second Embodiment

<Configuration Example of Transmission System of Data Stream Using General-Purpose Bus>

Figure 8:
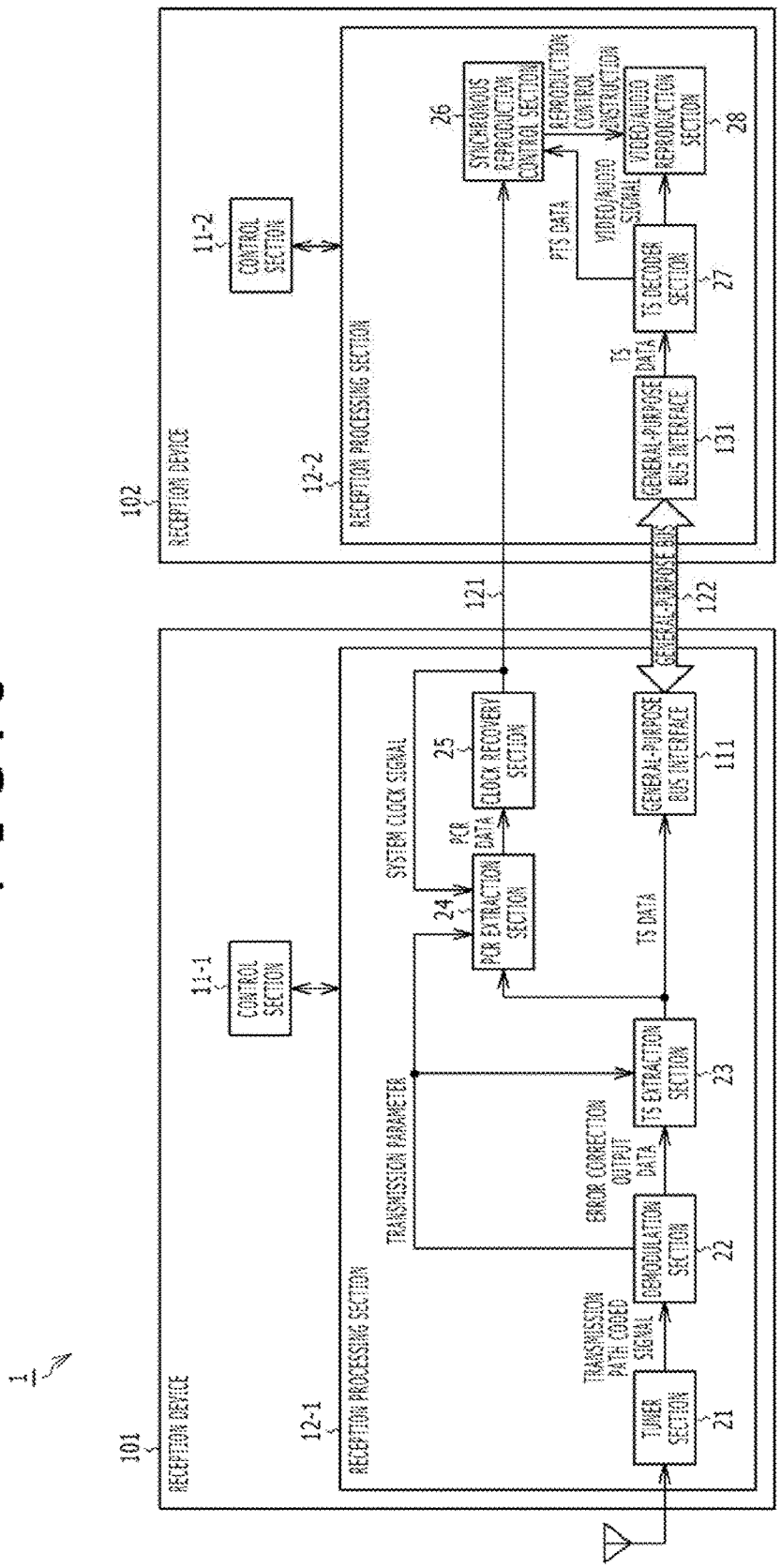
FIG. 8 is a block diagram illustrating a configuration example of a transmission system.

FIG. 8 is a block diagram illustrating another configuration example of the reception apparatus.

The reception apparatus 1 of FIG. 8 includes a reception device 101 and a reception device 102. For example, the reception device 101 and the reception device 102 each are configured by different LSIs.

As described above, in the present technology, the TS data is separated into the TS data for extracting the PCR data and the TS data for decoding the PCR data. Further, on the basis of the PCR data extracted from the TS data for extracting the PCR data, the system clock signal is generated and used for the synchronous reproduction control or the like as a decoding result of the TS data for decoding the PCR data.

Accordingly, as compared with a case of extracting the PCR data and a case of decoding the PCR data by using the same TS data as an object, timing control (jitter suppression) at the time of transmitting the data stream need not be performed and requirements are relieved at the time of transmitting the data stream. In the result, it is possible to flexibly form the system, such as transmission of the data stream is performed by using a general-purpose bus that is a transmission path in which a large amount of jitter is generated. The general-purpose bus is a transmission path that is used for even the transmission of data other than the data stream such as data processed by a CPU (not illustrated) mounted on the reception apparatus 1.

In the reception apparatus 1 illustrated in FIG. 8, demodulation of the data stream, processing of error correction etc. and clock recovery processing are performed by the reception device 101 on the preceding stage. Further, decoding of the data stream by using the system clock signal is performed by the reception device 102 on the subsequent stage. Transmission of the data stream from the reception device 101 to the reception device 102 is performed by using a general-purpose bus and transmission of the system clock signal generated by the clock recovery processing is performed by using an exclusive line.

As illustrated in FIG. 8, the reception device 101 and the reception device 102 are connected through a signal line 121 that is an exclusive line used for the transmission of the system clock signal and a general-purpose bus 122 used for the transmission of the TS data. As the general-purpose bus 122, for example, a USB and a PCI Express bus are used.

Hereinafter, a configuration of the reception apparatus 1 of FIG. 8 will be described in detail. In the components illustrated in FIG. 8, the same symbol is given to a component corresponding to the component illustrated in FIG. 1. Overlapping descriptions are omitted arbitrarily.

The reception device 101 includes a control section 11-1 and a reception processing section 12-1.

The control section 11-1 executes a predetermined program and controls an operation of the reception processing section 12-1. The reception processing section 12-1 includes the tuner section 21, the demodulation section 22, the TS extraction section 23, the PCR extraction section 24, the clock recovery section 25, and a general-purpose bus interface 111.

Desired TS data extracted by the TS extraction section 23 is supplied to the PCR extraction section 24 as data for extracting the PCR data and together is supplied to the general-purpose bus interface 111 as a data stream for transmitting the PCR data.

The general-purpose bus interface 111 outputs the TS data supplied from the TS extraction section 23 to the general-purpose bus 122.

The system clock signal obtained by performing the clock recovery processing by the clock recovery section 25 is supplied to the PCR extraction section 24 and together is output to the signal line 121.

On the other hand, the reception device 102 includes a control section 11-2 and a reception processing section 12-2.

The control section 11-2 executes a predetermined program and controls an operation of the reception processing section 12-2. The reception processing section 12-2 includes the synchronous reproduction control section 26, the TS decoder section 27, the video/audio reproduction section 28, and a general-purpose bus interface 131.

The synchronous reproduction control section 26 supplies the reproduction control instruction of a video signal and an audio signal to the video/audio reproduction section 28 on the basis of the PTS data supplied from the TS decoder section 27. The processes by the synchronous reproduction control section 26 are performed synchronously with the system clock signal supplied via the signal line 121 from the clock recovery section 25 of the reception device 101.

The general-purpose bus interface 131 receives the TS data supplied via the general-purpose bus 122 from the general-purpose bus interface 111 of the reception device 101 and supplies the TS data to the TS decoder section 27.

As described above, in the reception apparatus 1 of FIG. 8, the system clock signal is transmitted via an exclusive signal line in which a small amount of jitter is generated and is used for the synchronous reproduction control. Therefore, even if the data stream is transmitted via the general-purpose bus in which a large amount of jitter is generated, the synchronous reproduction of a video signal and an audio signal can be performed with accuracy similar to that of the reception apparatus 1 of FIG. 1.

3. Modification Example

<Another Configuration Example of Transmission System>

Figure 9:
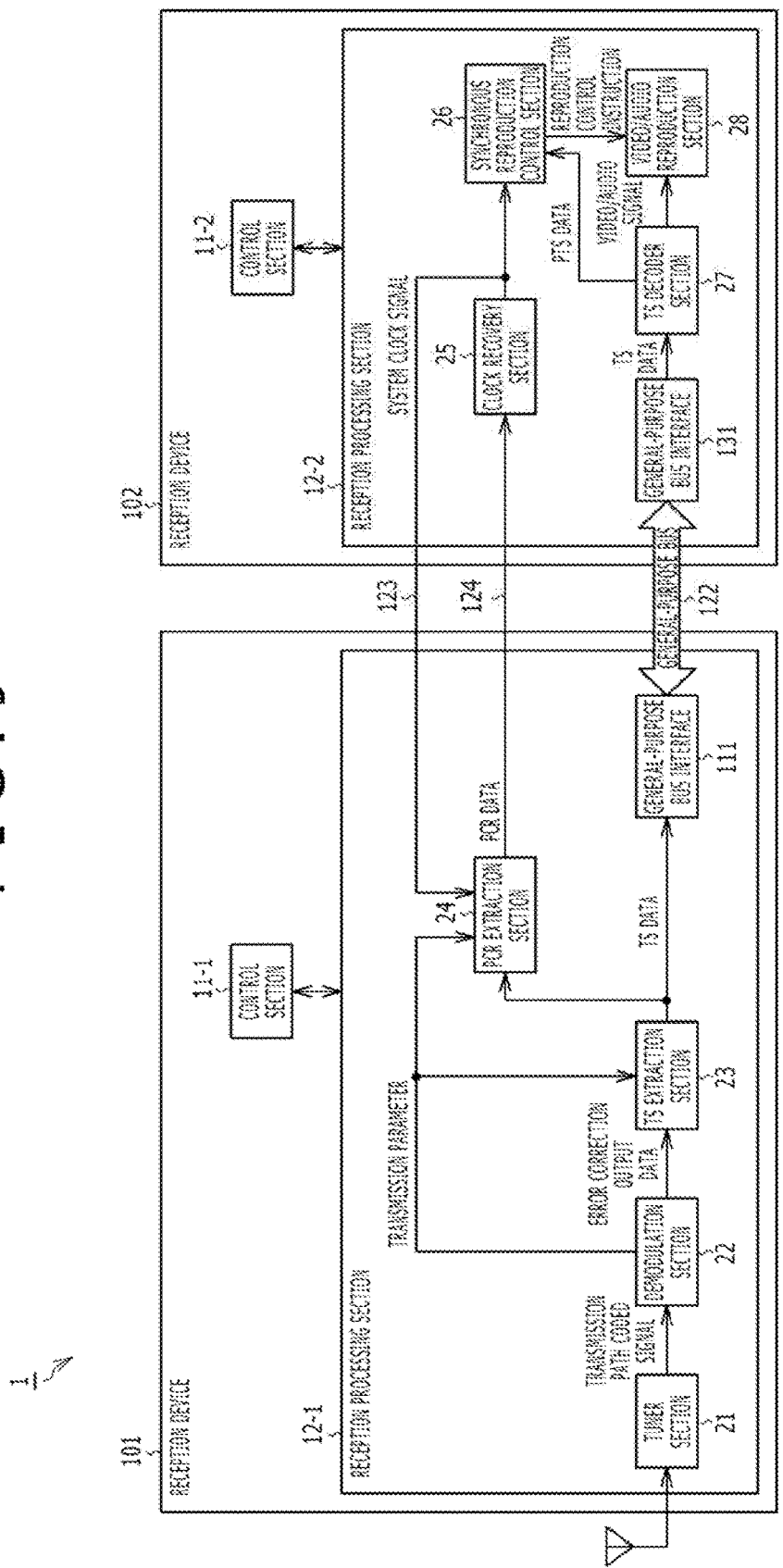
FIG. 9 is a block diagram illustrating another configuration example of the transmission system.

FIG. 9 is a block diagram illustrating still another configuration example of the reception apparatus 1.

A configuration illustrated in FIG. 9 differs from the configuration illustrated in FIG. 8 in that the clock recovery section 25 is provided not in the reception device 101 but in the reception device 102. As an exclusive line between the reception device 101 and the reception device 102, a signal line 124 that is a transmission path for the PCR data and a signal line 123 that is a transmission path for the system clock signal are provided.

That is, in the reception apparatus 1 of FIG. 9, the PCR data extracted by the PCR extraction section 24 of the reception device 101 is supplied to the reception device 102 via the signal line 124 and the reception device 102 performs the clock recovery processing on the PCR data. The system clock signal generated by the clock recovery section 25 of the reception device 102 is supplied to the synchronous reproduction control section 26 and together is supplied to the PCR extraction section 24 of the reception device 101 via the signal line 123. In this manner, it is possible to change the system configuration arbitrarily.

<Application to MMT-TLV System>

The present technology is applicable to even a broadcast stream other than the TS. For example, the present technology is applicable to even an MMT-TLV (MPEG Media Transport-Type Length Value) stream of domestic advanced wide band digital satellite broadcasting standard (NPL 3).

In a case in which a signal processed by the reception apparatus 1 is the MMT-TLV stream of the domestic advanced wide band digital satellite broadcasting standard, an NTP (Network Time Protocol) corresponds to the above-described time information. Further, in this case, the system clock frequency (N) is $2^N$ (power of 2) MHz.

In addition, the present technology is applicable to not only a reception device that receives a broadcast wave but also a reception section that is mounted on a communication device.

<Computer Configuration Example>

The above-described series of processing can also be performed by hardware or can also be performed by software. In a case in which the series of processing is performed by software, a program constituting the software is installed in a computer that is incorporated in dedicated hardware, a general-purpose personal computer, or the like from a program recording medium.

Figure 10:
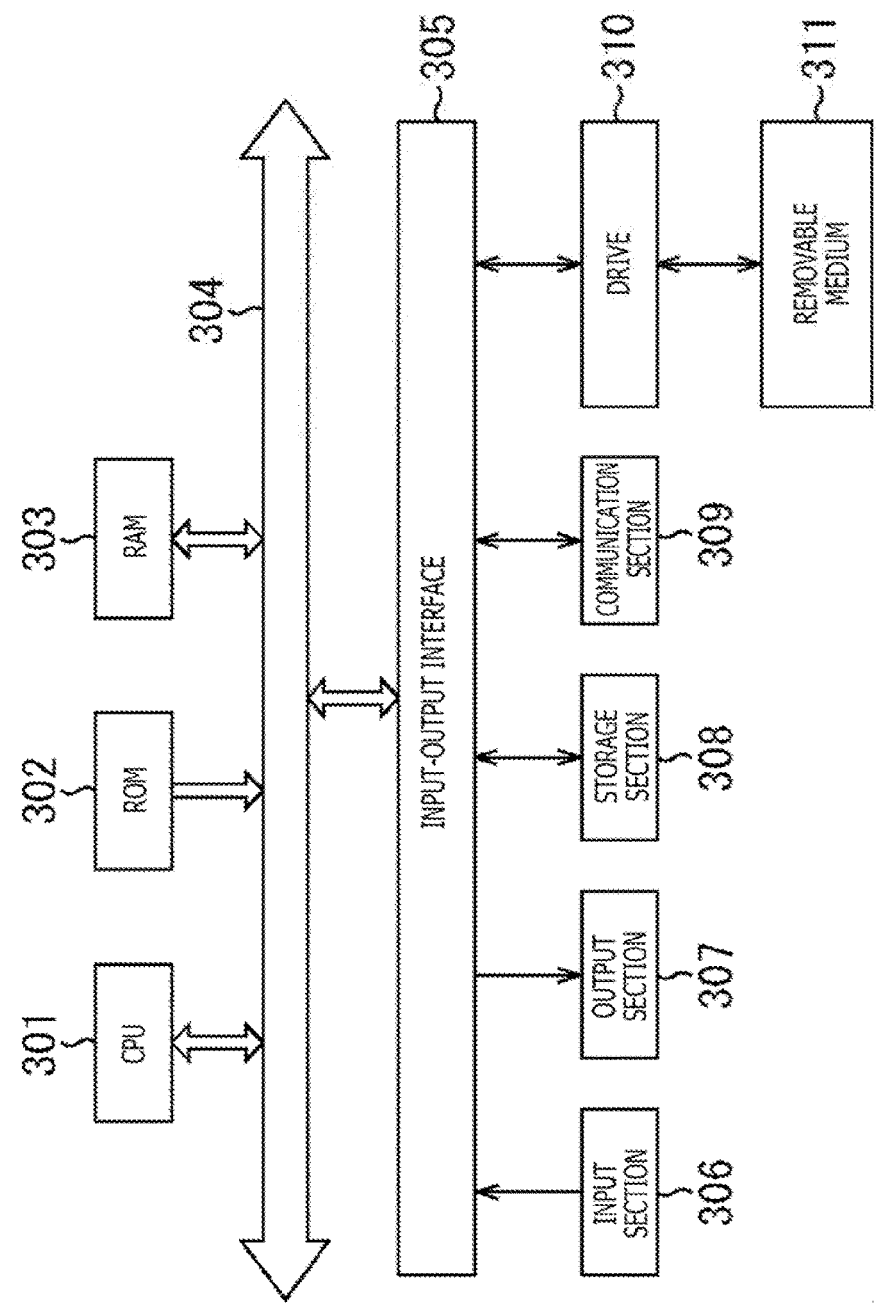
FIG. 10 is a block diagram illustrating a configuration example of a computer.

FIG. 10 is a block diagram illustrating a configuration example of hardware of a computer that performs the above-described series of processing by programs.

A CPU 301, a ROM (Read Only Memory) 302, and a RAM (Random Access Memory) 303 are connected to each other via a bus 304.

An input-output interface 305 is further connected to the bus 304. An input section 306 including a keyboard, a mouse, and the like and an output section 307 including a display, a speaker, and the like are connected to the input-output interface 305. In addition, a storage section 308 including a hard disk, a nonvolatile memory, and the like, a communication section 309 including a network interface and the like, and a drive 310 that drives a removable medium 311 are connected to the input-output interface 305.

In the computer configured as described above, for example, the CPU 301 loads a program stored in the storage section 308 into the RAM 303 via the input-output interface 305 and the bus 304 and executes the program to thereby perform the above-described series of processing.

The program executed by the CPU 301 is, for example, recorded in the removable medium 311, or is provided via a wired or wireless transmission medium, such as a local area network, the Internet, or digital broadcasting and is installed into the storage section 308.

Note that the program executed by the computer may be a program in which processing is performed in a time series in the order described in this specification or may be a program in which the processing is performed in parallel or at necessary timing, such as when the processing is called.

An embodiment of the present technology is not limited to the embodiments described above, and various changes can be made without departing from the spirit of the present technology.

In this specification, a system means a set of a plurality of components (such as a device or a module (part)) and does not take into account whether or not all the components are present in the same housing. Therefore, the system may be any of a plurality of devices stored in separate housings and connected through a network, and a single device in which a plurality of modules are stored in a single housing.

Incidentally, the advantageous effects described in this specification are strictly illustrative and are not limited thereto, and there may be advantageous effects other than those described in this specification.

An embodiment of the present technology is not limited to the embodiments described above, and various changes can be made without departing from the spirit of the present technology.

<Combination Example of Configuration>

The present technology may also take the following configurations.

(1)

An information processing apparatus including:

an extraction section configured to extract time information from a data stream including the time information serving as a reference upon generating a system clock signal;

a storage section configured to store the time information;

a control section configured to output the time information stored in the storage section synchronously with the system clock signal on the basis of a transmission rate of the data stream and position information regarding the time information in the data stream; and a generation section configured to perform clock recovery processing on the basis of the time information output from the storage section and generate the system clock signal.

(2)

The information processing apparatus according to (1) above, in which the control section specifies the transmission rate on the basis of a transmission parameter accompanying the data stream.

(3)

The information processing apparatus according to (1) or (2) above, in which the control section divides a frequency of the system clock signal in accordance with a ratio of the frequency of the system clock signal and the transmission rate and outputs the time information from the storage section synchronously with a clock signal in a position of the time information indicated by the position information among the clock signals obtained by dividing the frequency thereof.

(4)

The information processing apparatus according to any one of (1) to (3) above, further including:

a decode section configured to decode the data stream; and a reproduction control section configured to reproduce data obtained by decoding the data stream synchronously with the system clock signal.

(5)

The information processing apparatus according to any one of (1) to (4) above, in which the data stream is a TS, and the time information is a PCR.

(6)

The information processing apparatus according to any one of (1) to (4) above, in which the data stream is an MMT-TLV stream, and the time information is an NTP.

(7)

The information processing apparatus according to (2) above, in which the transmission parameter is TMCC information.

(8)

An information processing method including the steps of:

extracting time information from a data stream including the time information serving as a reference upon generating a system clock signal;

storing the time information in a storage section;

outputting the time information stored in the storage section synchronously with the system clock signal on the basis of a transmission rate of the data stream and position information regarding the time information in the data stream; and performing clock recovery processing on the basis of the time information output from the storage section and generating the system clock signal.

(9)

A program for causing a computer to perform processing including the steps of:

extracting time information from a data stream including the time information serving as a reference upon generating a system clock signal;

storing the time information in a storage section;

outputting the time information stored in the storage section synchronously with the system clock signal on the basis of a transmission rate of the data stream and position information regarding the time information in the data stream; and performing clock recovery processing on the basis of the time information output from the storage section and generating the system clock signal.

(10)

An information processing apparatus including:

a first information processing section; and a second information processing section configured to receive, from the first information processing section, a data stream supplied via a general-purpose bus and a system clock signal supplied via an exclusive signal line and perform processing, in which the first information processing section includes an extraction section configured to extract time information from the data stream including the time information serving as a reference upon generating the system clock signal, a storage section configured to store the time information, a control section configured to output the time information stored in the storage section synchronously with the system clock signal on the basis of a transmission rate of the data stream and position information regarding the time information in the data stream, a generation section configured to output the system clock signal generated by performing clock recovery processing on the basis of the time information output from the storage section to the exclusive signal line, and an output section configured to output the data stream to the general-purpose bus, and the second information processing section includes a reception section configured to receive the data stream output to the general-purpose bus from the first information processing section, a decode section configured to decode the data stream received by the reception section, and a reproduction control section configured to reproduce data obtained by decoding the data stream synchronously with the system clock signal output to the exclusive general-purpose bus from the first information processing section.

(11)

An information processing apparatus including:

a first information processing section configured to output a data stream including time information serving as a reference upon generating a system clock signal to a general-purpose bus and output the system clock signal generated by extracting the time information from the data stream and performing clock recovery processing on the basis of the extracted time information to an exclusive signal line; and a second information processing section configured to decode the data stream supplied via the general-purpose and reproduce data obtained by decoding the data stream synchronously with the system clock signal supplied via the exclusive signal line.

REFERENCE SIGNS LIST

1 Reception apparatus, 11 Control section, 12 Reception processing section, 21 Tuner section, 22 Demodulation section, 23 TS extraction section, 24 PCR extraction section, 25 Clock recovery section, 26 Synchronous reproduction control section, 27 TS decoder section, 28 Video/audio reproduction section, 31 PCR extractor, 32, 33 FIFO, 34 Output controller, 41 Transmission rate calculating section, 42 N:M frequency divider, 43 Up-counter, 44 Comparator, 45 AND circuit

The invention claimed is:

1. An information processing apparatus comprising:
an extraction circuitry configured to extract time information from a data stream including the time information serving as a reference upon generating a system clock signal;
a storage circuitry configured to store the time information;
a control circuitry configured to output the time information stored in the storage circuitry synchronously with the system clock signal on the basis of a transmission rate of the data stream and position information regarding the time information in the data stream; and
a generation circuitry configured to perform clock recovery processing on the basis of the time information output from the storage circuitry and generate the system clock signal,
wherein the control circuitry divides a frequency of the system clock signal in accordance with a ratio of the frequency of the system clock signal and the transmission rate and outputs the time information from the storage circuitry synchronously with a clock signal in a position of the time information indicated by the position information among the clock signals obtained by dividing the frequency thereof.

2. The information processing apparatus according to claim 1, wherein
the control circuitry specifies the transmission rate on the basis of a transmission parameter accompanying the data stream.

3. The information processing apparatus according to claim 2, wherein
the transmission parameter is Transmission and Multiplexing Configuration Control (TMCC) information.

4. The information processing apparatus according to claim 1, further comprising:
a decode circuitry configured to decode the data stream; and
a reproduction control circuitry configured to reproduce data obtained by decoding the data stream synchronously with the system clock signal.

5. The information processing apparatus according to claim 1, wherein
the data stream is a Transport Stream (TS), and
the time information is a Program Clock Reference (PCR).

6. The information processing apparatus according to claim 1, wherein
the data stream is an MPEG Media Transport-Type Length Value (MMT-TLV) stream, and
the time information is a Network Time Protocol (NTP).

7. An information processing method comprising:
extracting time information from a data stream including the time information serving as a reference upon generating a system clock signal;
storing the time information in a storage circuitry;
dividing a frequency of the system clock signal in accordance with a ratio of the frequency of the system clock signal and a transmission rate of the data stream;
outputting the time information from the storage circuitry synchronously with a clock signal in a position of the time information indicated by position information among the clock signals obtained by dividing the frequency thereof; and
performing clock recovery processing on the basis of the time information output from the storage circuitry and generating the system clock signal.

8. The information processing method according to claim 7, further comprising specifying the transmission rate on the basis of a transmission parameter accompanying the data stream.

9. The information processing method according to claim 8, wherein the transmission parameter is Transmission and Multiplexing Configuration Control (TMCC) information.

10. The information processing method according to claim 7, further comprising:
decoding the data stream; and
reproducing data obtained by decoding the data stream synchronously with the system clock signal.

11. The information processing method according to claim 7, wherein the data stream is a Transport Stream (TS), and wherein the time information is a Program Clock Reference (PCR).

12. The information processing method according to claim 7, wherein the data stream is an MPEG Media Transport-Type Length Value (MMT-TLV) stream, and wherein the time information is a Network Time Protocol (NTP).

13. A non-transitory computer-readable medium comprising a program that, when executed by an electronic processor, causes the electronic processor to perform a set of operations comprising:
extracting time information from a data stream including the time information serving as a reference upon generating a system clock signal;
storing the time information in a storage circuitry;
dividing a frequency of the system clock signal in accordance with a ratio of the frequency of the system clock signal and a transmission rate of the data stream;
outputting the time information from the storage circuitry synchronously with clock signal in a position of the time information indicated by position information among the clock signals obtained by dividing the frequency thereof; and
performing clock recovery processing on the basis of the time information output from the storage circuitry and generating the system clock signal.

14. The non-transitory computer-readable medium according to claim 13, wherein the set of operations further includes specifying the transmission rate on the basis of a transmission parameter accompanying the data stream.

15. The non-transitory computer-readable medium according to claim 13, wherein the set of operations further includes
decoding the data stream; and
reproducing data obtained by decoding the data stream synchronously with the system clock signal.

16. An information processing apparatus comprising:
a first information processing circuitry; and
a second information processing circuitry configured to receive, from the first information processing circuitry, a data stream supplied via a general-purpose bus and a system clock signal supplied via an exclusive signal line and perform processing, wherein the first information processing circuitry includes
an extraction circuitry configured to extract time information from the data stream including the time information serving as a reference upon generating the system clock signal,
a storage circuitry configured to store the time information,
a control circuitry configured to output the time information stored in the storage circuitry synchronously with the system clock signal on the basis of a transmission rate of the data stream and position information regarding the time information in the data stream,
a generation circuitry configured to output the system clock signal generated by performing clock recovery processing on the basis of the time information output from the storage circuitry to the exclusive signal line, and
an output circuitry configured to output the data stream to the general-purpose bus,
wherein the control circuitry divides a frequency of the system clock signal in accordance with a ratio of the frequency of the system clock signal and the transmission rate and outputs the time information from the storage circuitry synchronously with a clock signal in a position of the time information indicated by the position information among the clock signals obtained by dividing the frequency thereof, and wherein the second information processing circuitry includes
a reception circuitry configured to receive the data stream output to the general-purpose bus from the first information processing circuitry,
a decode circuitry configured to decode the data stream received by the reception circuitry, and
a reproduction control circuitry configured to reproduce data obtained by decoding the data stream synchronously with the system clock signal output to the exclusive signal line from the first information processing circuitry.

17. The information processing apparatus according to claim 16, wherein the control circuitry is further configured to specify the transmission rate on the basis of a transmission parameter accompanying the data stream.

18. The information processing apparatus according to claim 17, wherein the transmission parameter is Transmission and Multiplexing Configuration Control (TMCC) information.

19. An information processing apparatus comprising:
a first information processing circuitry configured to output a data stream including time information serving as a reference upon generating a system clock signal to a general-purpose bus and output the system clock signal generated by extracting the time information from the data stream and performing clock recovery processing on the basis of the extracted time information to an exclusive signal line; and
a second information processing circuitry configured to decode the data stream supplied via the general-purpose bus and reproduce data obtained by decoding the data stream synchronously with the system clock signal supplied via the exclusive signal line,
wherein the first information processing circuitry is further configured to divide a frequency of the system clock signal in accordance with a ratio of the frequency of the system clock signal and a transmission rate of the data stream and output the time information from a storage circuitry synchronously with a clock signal in a position of the time information indicated by position information among the clock signals obtained by dividing the frequency thereof.

* * * * *